United States Patent
Li

(10) Patent No.: US 9,633,445 B1
(45) Date of Patent: Apr. 25, 2017

(54) CALCULATING A SHARPNESS VALUE

(71) Applicant: Motorola Mobility LLC, Chicago, IL (US)

(72) Inventor: Dalong Li, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/001,738

(22) Filed: Jan. 20, 2016

(51) Int. Cl.
*G06K 9/34* (2006.01)
*G06T 7/00* (2017.01)
*H04N 5/232* (2006.01)

(52) U.S. Cl.
CPC ........... *G06T 7/0083* (2013.01); *H04N 5/232* (2013.01); *G06T 2207/30168* (2013.01)

(58) Field of Classification Search
CPC .......... H04N 5/232; G06T 2207/30168; G06T 2207/20192; G06T 5/003; G06K 9/4604
See application file for complete search history.

(56) References Cited

U.S. PATENT DOCUMENTS

| 2014/0140633 A1* | 5/2014 | Wang ................... G06K 9/6255 382/255 |
| 2015/0358542 A1* | 12/2015 | Sato ....................... H04N 5/265 348/239 |

OTHER PUBLICATIONS

Jing Wan, et al., "An Iris Image Quality Assessment Method Based on Laplacian of Gaussian Operation", MVA2007 IAPR Conference on Machine Vision Applications, May 16-18, 2007, pp. 248-251, Tokyo, Japan.
Nadezhda Sazonova, et al., "Impact of Out-of-Focus Blur on Iris Recognition", www.clarkson.edu/biosal/pdf/impactiris.pdf, Jan. 14, 2016, 7 pages.

* cited by examiner

*Primary Examiner* — Phuoc Tran

(57) ABSTRACT

For calculating a sharpness value, a method filters an image with an edge extraction filter to generate filtered pixel values for each pixel of the image. The method further calculates a sharpness threshold as a function of the filtered pixel values. In addition, the method calculates a sharpness weight for each filtered pixel value as a function of the filtered pixel value and the sharpness threshold. The method calculates a weighted pixel value for each filtered pixel value as a function of the filtered pixel value and the corresponding sharpness weight for the filtered pixel value. The method further calculates a sharpness value for the image as a function of the weighted pixel values.

20 Claims, 13 Drawing Sheets

| Filtered Pixel Value 220 | Sharpness Weight 210 |
|---:|---:|
| 16 | 0 |
| 61 | 0 |
| 56 | 0 |
| 68 | 0 |
| 116 | 0 |
| 29 | 0 |
| 188 | 1 |
| 249 | 1 |
| 237 | 1 |
| 77 | 0 |
| 197 | 1 |
| 66 | 0 |
| 122 | 1 |
| 131 | 1 |

| Image 120a |
| Image 120b |
| Image 120c |
| Image 120d |
| Image 120e |

295

| Image ID 360 |
| Sharpness Threshold 260 |
| Sharpness Value 285 |
| Pixel Data 200 |

⋮

| Pixel Data 200 |

CALCULATING A SHARPNESS VALUE

BACKGROUND

Field

The subject matter disclosed herein relates to image sharpness and more particularly relates to calculating a sharpness value.

Description of the Related Art

Images including digital images are often most attractive or useful when in sharp focus.

BRIEF SUMMARY

A method for calculating a sharpness value is disclosed. The method filters an image with an edge extraction filter to generate filtered pixel values for each pixel of the image. The method further calculates a sharpness threshold as a function of the filtered pixel values. In addition, the method calculates a sharpness weight for each filtered pixel value as a function of the filtered pixel value and the sharpness threshold. The method calculates a weighted pixel value for each filtered pixel value as a function of the filtered pixel value and the corresponding sharpness weight for the filtered pixel value. The method further calculates a sharpness value for the image as a function of the weighted pixel values. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating one embodiment of filtered pixel values and sharpness weights;

DETAILED DESCRIPTION

Figure 1:
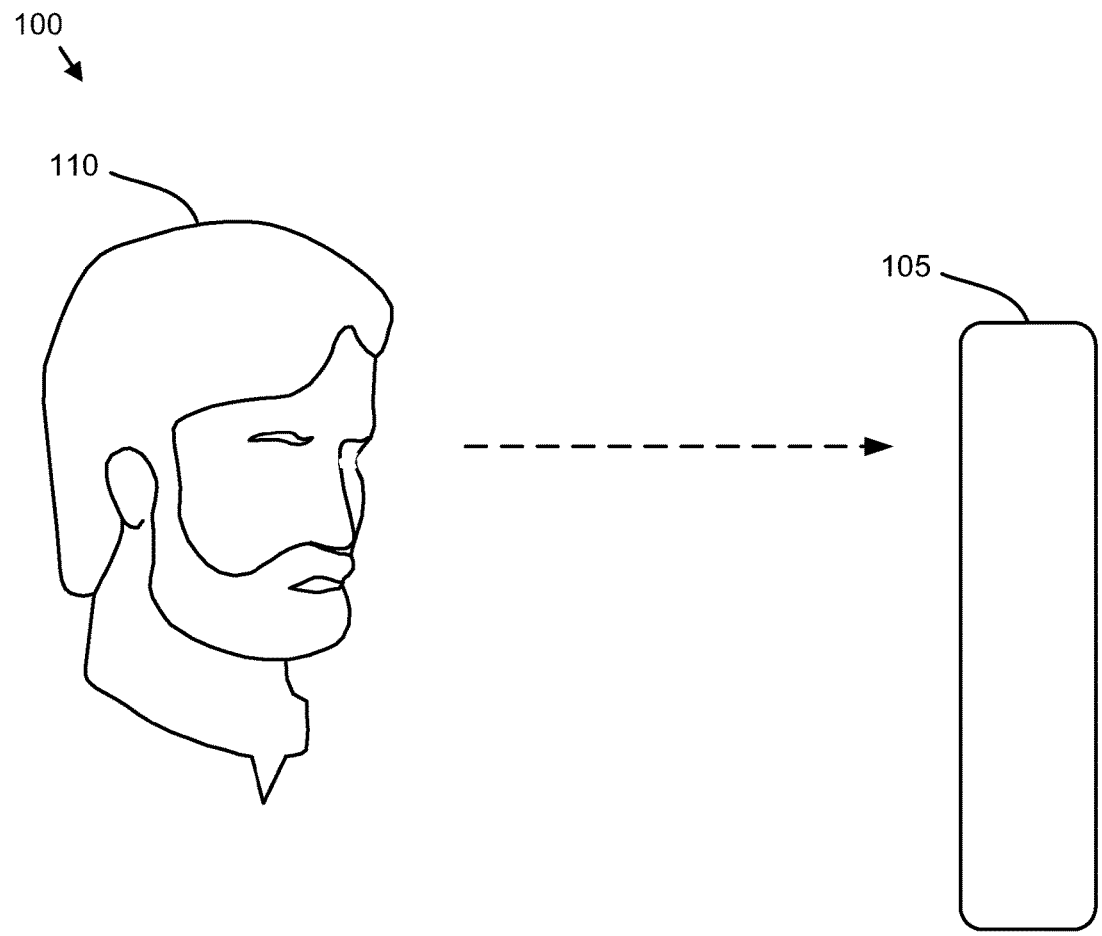
FIG. 1 is a drawing illustrating one embodiment of a camera system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a camera system 100. The camera system 100 may capture, record, and manage images. In the depicted embodiment, the camera system 100 includes an electronic device 105. The electronic device 105 may be a camera. Alternatively, the electronic device 105 may be a mobile telephone, a tablet computer, laptop computer, or the like with the camera embodied in the electronic device 105. The camera may capture an image of the subject 110.

The electronic device 105 may automatically adjust one or more camera parameters in order to capture the image. The attractiveness of the image may be enhanced when the image is in sharper focus. The embodiments described herein calculate a sharpness value for an image. The sharpness value may be used to select a sharpest image from a plurality of images. In addition, the sharpness value may be used to update camera parameters based on the sharpness value.

Figure 2A:
FIG. 2A is a schematic block diagram illustrating one embodiment of an image.

FIG. 2A is a schematic block diagram illustrating one embodiment of an image 120. In the depicted embodiment, the image 120 includes a plurality of pixels 225. Although for simplicity only 64 pixels 225 are shown, the image 120 may have any number of pixels 225.

Figure 2B:
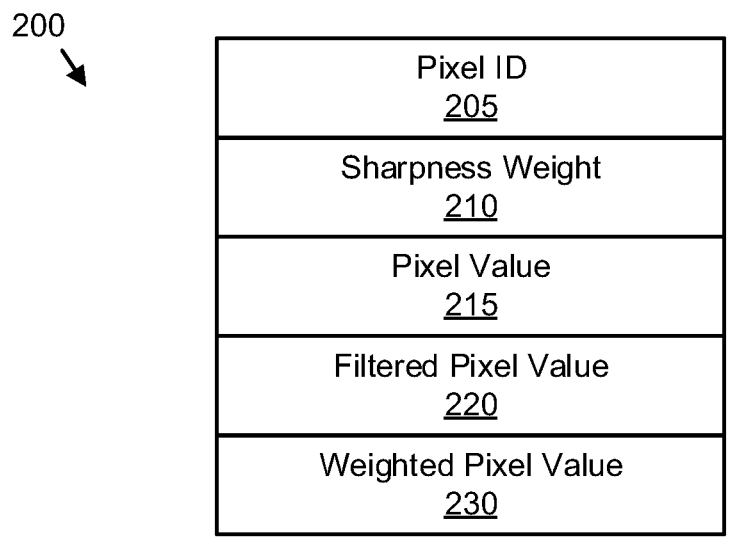
FIG. 2B is a schematic block diagram illustrating one embodiment of pixel data.

FIG. 2B is a schematic block diagram illustrating one embodiment of pixel data 200. The pixel data 200 may be organized as a data structure in a memory. Pixel data 200 may correspond to each pixel 225 of an image 120. In the depicted embodiment, the pixel data 200 includes a pixel identifier 205, a sharpness weight 210, a pixel value 215, a filtered pixel value 220, and a weighted pixel value 230.

The pixel value 215 may be captured by the camera. In one embodiment, the pixel value 215 includes values for three or more colors. Alternatively, the pixel value 215 may include a value for a single color. The filtered pixel value 220 may be generated from the pixel value 215 by filtering the image 120 with an edge extraction filter. The edge extraction filter may be selected from the group consisting of a Laplacian of Gaussian filter, a downsize function and a Laplacian filter, a Sobel filter, a Canny edge detector, a Difference of Gaussian filter, a Prewitt filter, and a Roberts filter. The filtered pixel values 220 may be used to calculate a sharpness threshold as will be described hereafter.

The sharpness weight 210 for each pixel 225 may be calculated as a function of the filtered pixel values 220 and the sharpness threshold. In one embodiment, the sharpness weight 210 is a value of 1 for a filtered pixel value 220 that exceeds the sharpness threshold and the sharpness weight is a value of 0 for a filtered pixel value 220 that is less than or equal to the sharpness threshold.

In an alternative embodiment, the sharpness weight 210 for each filtered pixel value 220 is calculated as a linear function of the filtered pixel value 220. For example, the sharpness weight SW 210 may be calculated using Equation 1, where FPV is the filtered pixel value 220 and k is a nonzero constant.

$$SW = k*FPV \qquad \text{Equation 1}$$

Alternatively, the sharpness weight 210 may be calculated as a function of a normalized histogram value for the filtered pixel value 220. In a certain embodiment, the sharpness weight SW 210 is calculated using Equation 2, where NHV is a normalized histogram value. For example, the filtered pixel values 220 for the image 120 may include values ranging from 0 to 255. A histogram of the filtered pixel values 220 for the image 120 may indicate a frequency of each filtered pixel value 220. The most common filtered pixel value 220 may be normalized to a value of one with all other filtered pixel values 220 scaled proportionally, yielding the normalized histogram values NHV.

$$SW = 1 - NHV \qquad \text{Equation 2}$$

The weighted pixel value 230 may be calculated for each filtered pixel value 220 as a function of the filtered pixel value 220 and the corresponding sharpness weight 210 for the filtered pixel value 220. In one embodiment, the weighted pixel value 230 is a product of the filtered pixel value 220 and the corresponding sharpness weight 210. For example, the weighted pixel value WPV 230 may be calculated using Equation 3.

$$WPV = FPV*SW \qquad \text{Equation 3}$$

FIG. 2C is a schematic block diagram illustrating one embodiment of filtered pixel values 220 and sharpness weights 210. In the depicted embodiment, sharpness weights 210 are calculated for a plurality of filtered pixel values 220 with the sharpness threshold of 120. The sharpness weight 110 is 1 for filtered pixel value 220 that exceeds the sharpness threshold and 0 for a filtered pixel value 220 that is less than or equal to the sharpness threshold.

Figure 2D:
FIG. 2D is a schematic block diagram illustrating one embodiment of an image database.

FIG. 2D is a schematic block diagram illustrating one embodiment of an image database 350. The image database 350 may be organized in a memory. In the depicted embodiment, the image database 350 includes a plurality of images 120a-e. In one embodiment, one or more of the images 120a-e may be of a single scene. In addition, one or more of the images 120a-e may have been captured within a short time interval.

Figure 2E:
FIG. 2E is a schematic block diagram illustrating one embodiment of image data.

FIG. 2E is a schematic block diagram illustrating one embodiment of image data 295 for an image 120. The image data 295 may be organized as a data structure in a memory. In the depicted embodiment, the image data 295 includes an image identifier 360, the sharpness threshold 260, the sharpness value 285, and pixel data 200 for one or more pixels 225.

The image identifier 360 may uniquely identify the image 120. The sharpness threshold 260 and the sharpness value 285 may be calculated as will be described hereafter.

Figure 2F:
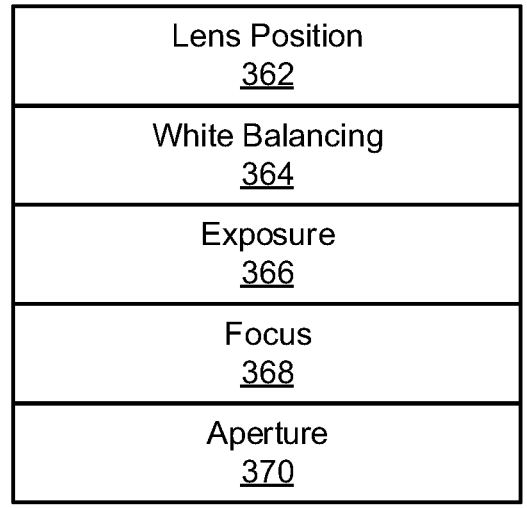
FIG. 2F is a schematic block diagram illustrating one embodiment of camera parameters.

FIG. 2F is a schematic block diagram illustrating one embodiment of camera parameters 355. The camera parameters 355 may be organized as a data structure in a memory. In the depicted embodiment, the camera parameters 355 include a lens position 362, white balancing 364, an exposure 366, a focus 368, and an aperture 370.

The lens position 362 may specify a position for one or more lenses of the camera. The white balancing 364 may specify a white balance for an image 120. The exposure 366 may specify an exposure time interval. The focus 368 may specify a focal arrangement of one or more lenses. The aperture 370 may specify an aperture size.

Figure 3A:
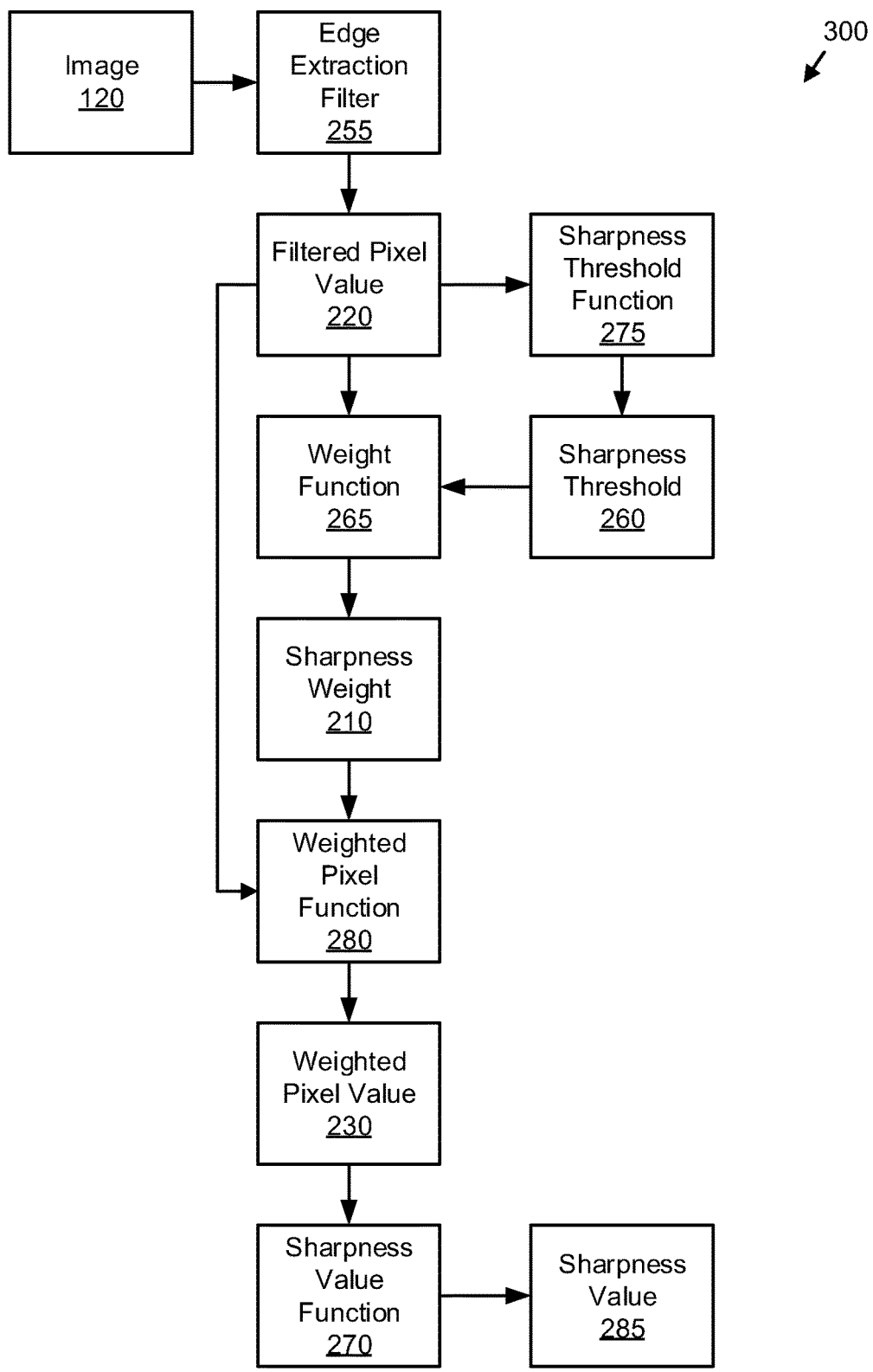
FIG. 3A is a schematic flow chart diagram illustrating one embodiment of a sharpness value calculation process.

FIG. 3A is a schematic flow chart diagram illustrating one embodiment of a sharpness value calculation process 300. In the depicted embodiment, an image 120 is filtered with an edge extraction filter 255 to generate a plurality of filtered pixel values 220. The sharpness threshold 260 may be generated from the plurality of filtered pixel values 220 using the sharpness threshold function 275.

In one embodiment, the sharpness threshold function 275 calculates the sharpness threshold ST 260 as a mean of the plurality of filtered pixel values 220 as shown in Equation 4, where n is the number of filtered pixel values 220.

$$ST = \Sigma FPV/n \qquad \text{Equation 4}$$

In an alternative embodiment, the sharpness threshold function 275 calculates the sharpness threshold 260 by generating a bimodal histogram of the filtered pixel values 240. In addition, the sharpness threshold function 275 may select the sharpness threshold 260 to minimize a variance between each bimodal mode of the histogram.

A weight function 265 may calculate the sharpness weight 210 for each filtered pixel value 220 may as a function of the filtered pixel value 220 and the sharpness threshold 260. In one embodiment, the weight function 265 calculates the sharpness weights 210 as illustrated in FIG. 2C.

A weighted pixel function 280 may calculate the weighted pixel values 230 for each filtered pixel value 220 as a function of the filtered pixel value 220 and the corresponding sharpness weight 210 for the filtered pixel value 220. In one embodiment, the weighted pixel function 280 calculates each weighted pixel value 230 as a product of the corresponding filtered pixel value 220 and sharpness weight 210 as shown in Equation 3.

A sharpness value function 270 may calculate the sharpness value 285 from the plurality of weighted pixel values 230. The sharpness value 285 may be calculated as a function of the weighted pixel values 230. In one embodiment, the sharpness value function 270 calculates the sharpness value 285 as a mean of the weighted pixel values 230.

Figure 3B:
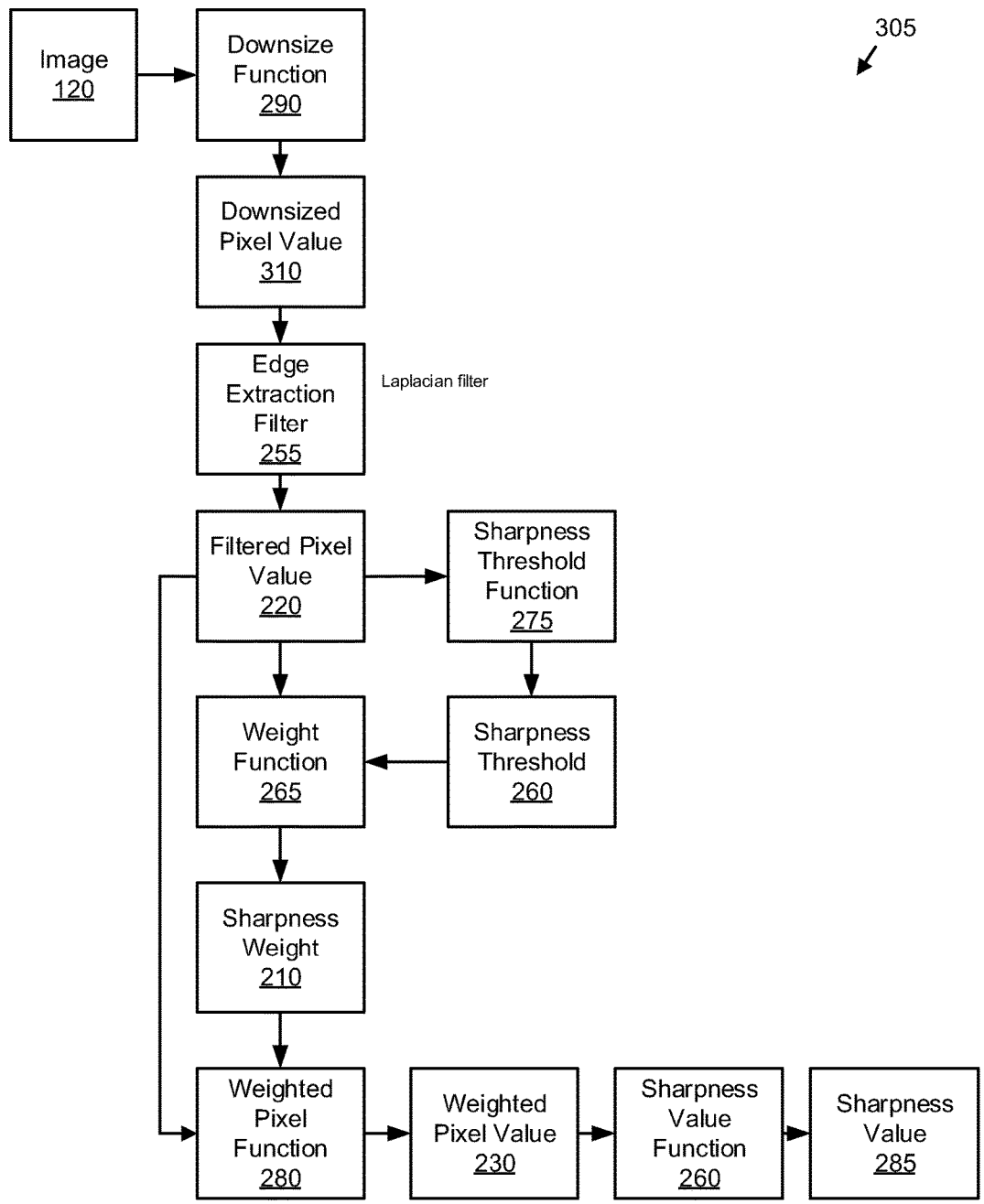
FIG. 3B is a schematic flow chart diagram illustrating one alternate embodiment of a sharpness value calculation process.

FIG. 3B is a schematic flow chart diagram illustrating one alternate embodiment of a sharpness value calculation process 305. In the depicted embodiment, a downsize function 290 generates a plurality of downsized pixel values 310 from the pixels 225 of the image 120. The downsize function 290 may scale the image 120 to generate a reduced number of downsized pixels with downsized pixel values 310. For example, the downsize function 290 may downsize a 1,0000 by 1,000 pixel image 120 to a 500×500 pixel image 120. The edge extraction filter 225 may generate the filtered pixel values 220 from the downsized pixel values 310. In one embodiment, the edge extraction filter 225 is a Laplacian filter. The process 305 may further generate the sharpness value 285 from the filtered pixel values 220 as described in FIG. 3A.

Figure 3C:
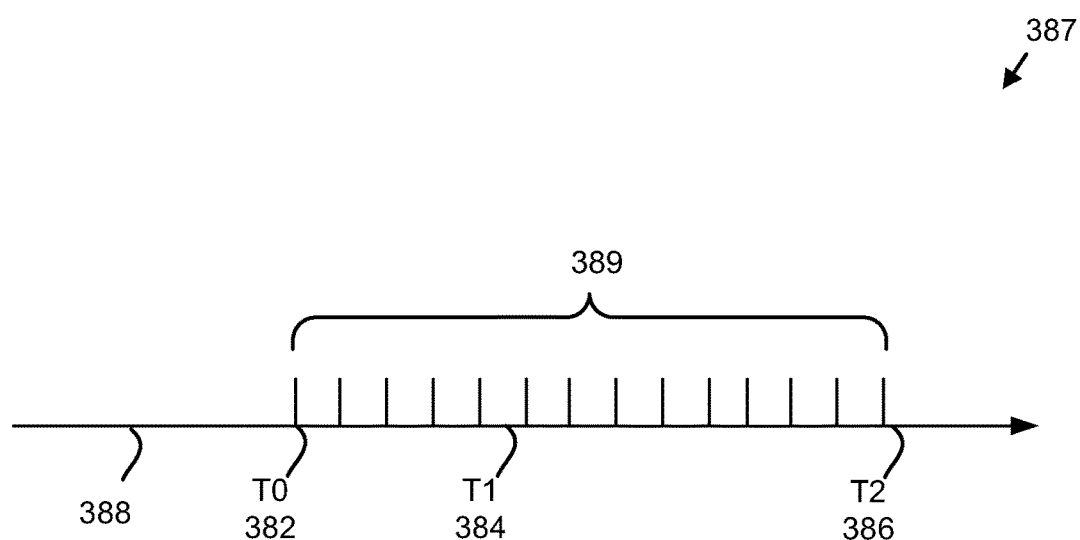
FIG. 3C is a drawing illustrating one embodiment of an image capture timeline.

FIG. 3C is a drawing illustrating one embodiment of an image capture timeline 387. In the depicted embodiment, an timeline arrow 388 depicts a flow of time. A trigger event T1 384 is shown on the timeline arrow 388. The trigger event 384 may be a command to capture an image 120 with the camera. In one embodiment, a plurality of images 120 may be captured at capture times 389 from an initial capture time T0 382 until a terminal capture time T2 386. The capture times 389 may be before the trigger event 384, concurrent with the trigger event 384, and after the trigger event 384.

Figure 4:
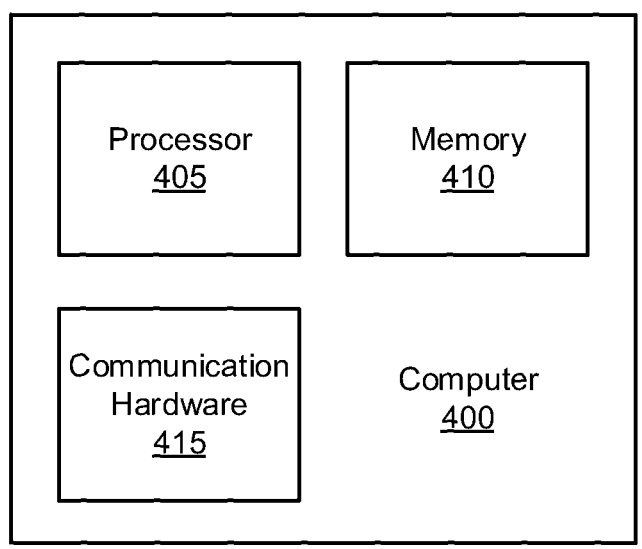
FIG. 4 is a schematic block diagram illustrating one embodiment of a computer.

FIG. 4 is a schematic block diagram illustrating one embodiment of a computer 400. The computer 400 may be embodied in the electronic device 105. In the depicted embodiment, the computer 400 includes a processor 405, memory 410, and communication hardware 415. The memory 410 may include a semiconductor storage device, hard disk drive, an optical storage device, a micromechanical storage device, and combinations thereof. The memory 410 may store code. The processor 405 may execute the code. The communication hardware 415 may communicate with other devices.

Figure 5A:
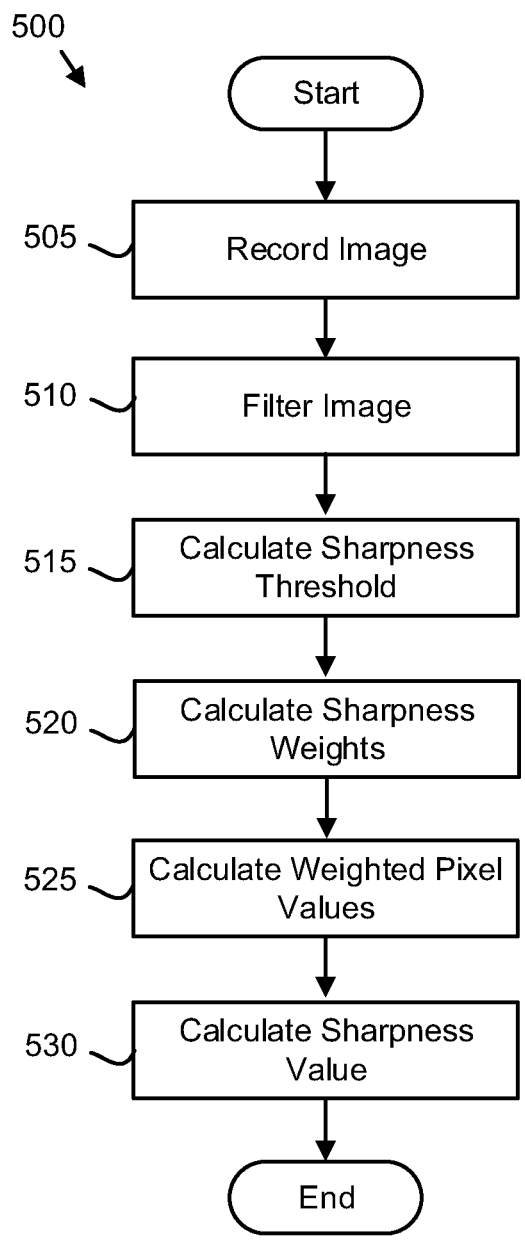
FIG. 5A is a schematic flow chart diagram illustrating one embodiment of a sharpness value calculation method.

FIG. 5A is a schematic flow chart diagram illustrating one embodiment of a sharpness value calculation method 500. The method 500 may calculate the sharpness value 285 for one or more images 120. The method 500 may be performed by the electronic device 105. In addition, the method 500 may be performed by the processor 405 and/or other semiconductor hardware embodied in the electronic device 105.

The method 500 starts, and in one embodiment, the processor 405 records the image 120. The electronic device 105 may capture the image 120 with the camera of the electronic device 105.

The processor 405 may filter 510 the image 120 with the edge extraction filter 255 to generate the filtered pixel values 220 for each pixel 225 of the image 120. In one embodiment, the processor 405 employees the downsize function 290 to generate the downsized pixel values 310 from the pixels 225 and filters 510 the downsized pixel values 310 with the edge extraction filter 255 to generate the filtered pixel values 220 for each pixel 225 of the image 120.

The processor 405 may further calculate 515 the sharpness threshold 260 as a function of the filtered pixel values 220. In addition, the processor 405 may calculate 520 a sharpness weight 210 for each filtered pixel value 220 as a function of the filtered pixel value 220 and the sharpness threshold 260.

In one embodiment, the processor 405 calculates 525 a weighted pixel value 230 for each filtered pixel value 220 as a function of the filtered pixel value 220 and the corresponding sharpness weight 210 for the filtered pixel value 220. In addition, the processor 405 may calculate 530 the sharpness value 285 as a function of the weighted pixel values 230 and the method 500 ends.

In one embodiment, the sharpness value 285 is calculated 530 as a mean of the weighted pixel values 230. In a certain embodiment, the sharpness value 285 is calculated 530 using Equation 5, where WPV are the weighted pixel values, n is the number of weighted pixel values, and k is a nonzero constant $$SV = k * \Sigma WPV / n \qquad \text{Equation 5}$$

Figure 5B:
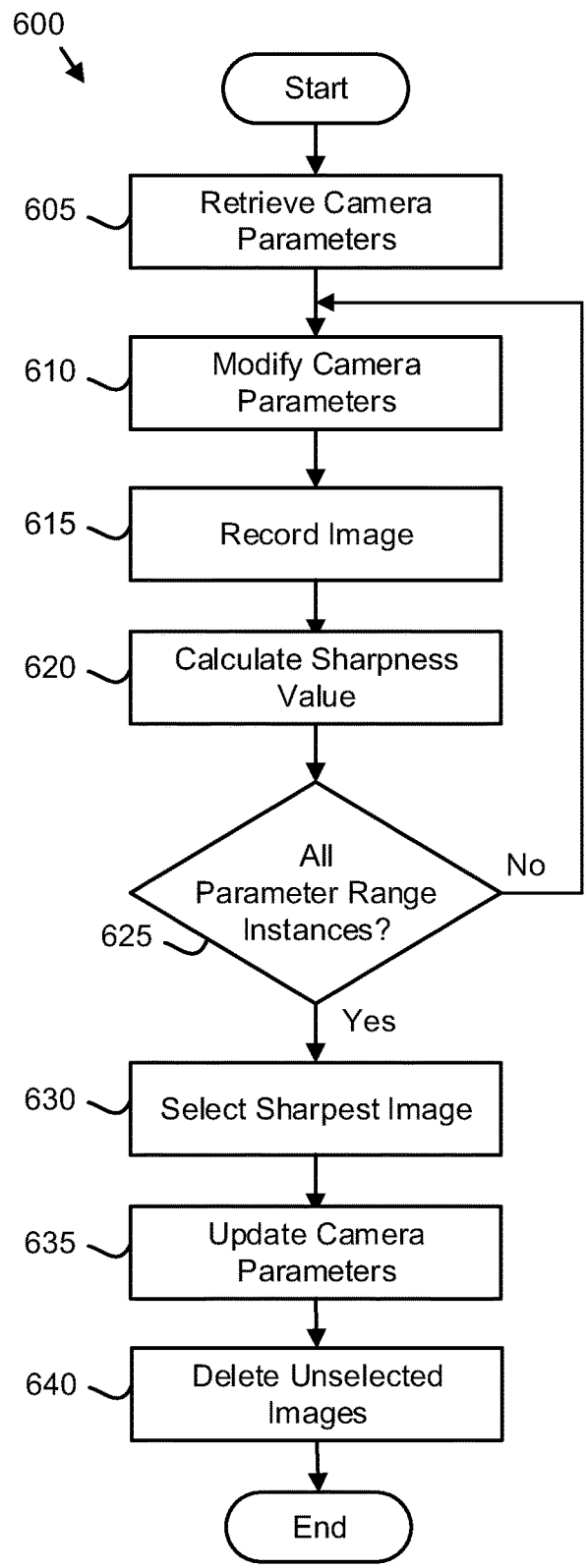
FIG. 5B is a schematic flow chart diagram illustrating one embodiment of a camera parameter update method.

FIG. 5B is a schematic flow chart diagram illustrating one embodiment of a camera parameter update method 600. The method 600 may update the camera parameters 355 based on the sharpness values 285 for one or more images 120. The method 600 may be performed by the electronic device 105. In addition, the method 600 may be performed by the processor 405 and/or other semiconductor hardware embodied in the electronic device 105.

The method 600 starts, and in one embodiment, the processor 405 retrieves 605 the camera parameters 355 from the memory 410. The processor 405 may retrieve 605 default camera parameters 355. In addition, the processor 405 may modify 610 the camera parameters 355. In one embodiment, the processor 405 may modify 610 the camera parameters 355 based on the current scene observed by the camera.

Each of the camera parameters 355 such as the lens position 362, the white balancing 364, the exposure 366, the focus 368, and the aperture 370 may be associated with a range of values. Each combination of values for the camera parameters 355 may comprise an instance in a range of camera parameters 355. The processor 405 may modify 610 the camera parameters 355 to a specified instance within the range of camera parameters 355.

The electronic device 105 may record 615 an image 210 with a corresponding instance of camera parameters 355. In one embodiment, the electronic device 105 records 615 a plurality of images 120 with corresponding camera parameters 355 for each image 120 of the plurality of images 120. Each image 120 may be captured and recorded 615 at a capture time 389 that is one of before the trigger event 384, concurrent with the trigger event 384, and after the trigger event 384. The processor 405 may further calculate 620 the sharpness value 285 for the image 120.

The processor 405 may determine 625 if images 120 have been captured for all instances of the range of camera parameters 355. If images for all instances of the range of camera parameters 355 have not been captured, the processor 405 may modify 610 the camera parameters 355 to a new instance of the range of camera parameters 355. All defined instances of the range of camera parameters 355 may eventually be used.

If images 120 for all instances of the range of camera parameters 355 have been recorded, the processor 405 may select 630 a sharpest image 120 with the greatest sharpness value 285. The processor 405 may further update 635 the default camera parameters 355 stored in the memory 410 with the instance of first camera parameters 355 corresponding to the sharpest image 120. As a result, the camera parameters 355 may be updated 635 to more useful values.

In one embodiment, the processor 405 further deletes 640 the unselected images 120 of the plurality of images 120 and the method 600 ends. As a result, the sharpest image 120 with the greatest sharpness value 285 may be retained by the electronic device 105.

Figure 5C:
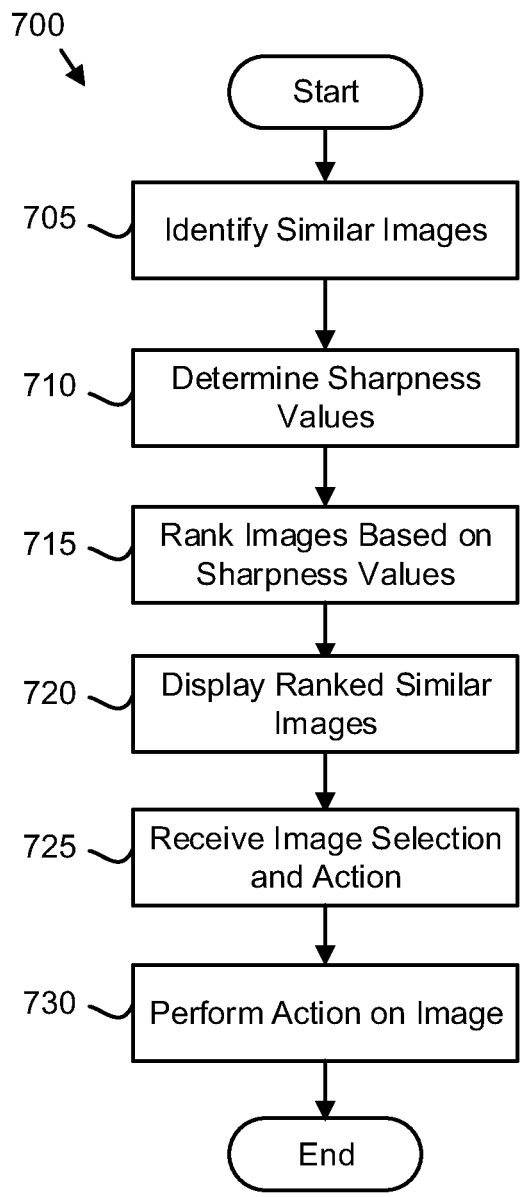
FIG. 5C is a schematic flow chart diagram illustrating one embodiment of an image ranking method.

FIG. 5C is a schematic flow chart diagram illustrating one embodiment of an image ranking method 700. The method 700 may rank a plurality of images 120 such as the images 120 in the image database 350. In addition, the method 700 may receive one or more image selections and actions associated with the image selections and perform the actions on the selected images 120. The method 700 may be performed by the electronic device 105. In addition, the method 700 may be performed by the processor 405 and/or other semiconductor hardware embodied in the electronic device 105.

The method 700 starts, and in one embodiment, the processor 405 identifies 705 one or more similar images 120. The similar images 120 may be captured between the initial capture time 382 and the terminal capture time 386. Alternatively, the similar images 120 may include any image 120 in the image database 350. In one embodiment, an image 120 is identified 705 as a similar image 120 if the image 120 has an image difference with another image 120 that is less than a difference threshold. As a result, the processor 405 may identify 705 the one or more similar images 120 that represent a similar scene and/or subjects.

The processor 405 may determine 710 the sharpness value 285 for each of the similar images 120. In one embodiment, the processor 405 may calculate the sharpness value 285 for each of the similar images 120. Alternatively, the processor 405 may retrieve the sharpness value 285 for each of the similar images 120 from the memory 410.

The processor 405 may rank 715 the similar images 120 based on the sharpness values 285. In one embodiment, the processor 405 rank 715 the similar images 120 from highest sharpness value 285 to lowest sharpness value 285.

The processor 405 may display 720 the ranked similar images 120. The similar images 120 may be displayed from highest sharpness value 285 to lowest sharpness value 285. The processor 405 may further receive 725 an image selection of one or more of the similar images 120 and/or an action associated with the selected similar images 120. The action may be a save action. Alternatively, the action may be a delete action.

In one embodiment, the processor 405 performs 730 an action on each image 120 of the plurality of similar images 120 and the method 700 ends. The processor 405 may perform 730 the action on each image 120 of the plurality of similar images 120 based on an image rank for each image 120. For example, a save action may be performed on one or more highest ranking images 120. Similarly, a delete action may be performed 730 on one or more lowest ranking images 120.

The processor 405 may perform 730 a selected action for one or more selected images 120. For example, if one or more highest ranking images 120 is selected and an enhance action is also selected, the processor 405 may perform the enhance action for the one or more selected highest ranking images 120. As a result, the sharpness value based ranking guides in the selection of the images 120.

The embodiments automatically calculate the sharpness value 285 by using the edge extraction filter 255 to generate the filtered pixel values 220. In addition, the embodiments calculate a sharpness threshold 260 as a function of the filtered pixel values 220 and calculate a sharpness weight 210 for each filtered pixel value 220 as a function of the filtered pixel value 220 and the sharpness threshold 260. The embodiments further calculate the weighted pixel value 230 for each filtered pixel value 220 as a function of the filtered pixel value 220 and the corresponding sharpness weight 210 for the filtered pixel value 220. The embodiments calculate a sharpness value 285 is a function of the weighted pixel values 230. As a result, the sharpness value 285 may be rapidly and efficiently calculated.

In addition, the sharpness value 285 may be used to select the sharpest image 125 with the greatest sharpness value 285. The sharpness value 285 may also be used to update default camera parameters 355, delete images 120 with lower sharpness values 285, select images 120 for actions, and rank a plurality of similar images 120. As a result, the embodiments may enhance the capture of quality images 120 and the management of the images 120 after the images 120 are recorded.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    filtering, by use of a processor, an image with an edge extraction filter to generate filtered pixel values for each pixel of the image;
    calculating a sharpness threshold as a function of the filtered pixel values;
    calculating a sharpness weight for each filtered pixel value as a function of the filtered pixel value and the sharpness threshold;
    calculating a weighted pixel value for each filtered pixel value as a function of the filtered pixel value and the corresponding sharpness weight for the filtered pixel value; and
    calculating a sharpness value for the image as a mean of the weighted pixel values.

2. The method of claim 1, the method further comprising:
    recording a plurality of images with corresponding camera parameters for each image of the plurality of images, wherein each image is captured at a capture time that is one of before a trigger event, concurrent with the trigger event, and after the trigger event;
    calculating a sharpness value for each image of the plurality of images; and
    selecting a sharpest image with a greatest sharpness value.

3. The method of claim 2, the method further comprising:
    updating default camera parameters with first camera parameters corresponding to the sharpest image; and
    deleting unselected images of the plurality of images.

4. The method of claim 1, the method further comprising:
    identifying a plurality of similar images;
    determining a sharpness value for each image of the plurality of similar images;
    ranking the plurality of similar images based on the sharpness values; and
    performing an action on each image of the plurality of similar images based on an image rank for the image.

5. The method of claim 1, wherein the sharpness threshold is calculated by one of calculating a mean of the filtered pixel values and generating a bimodal histogram of the filtered pixel values and selecting the sharpness threshold to minimize a variance between each bimodal mode.

6. The method of claim 1, wherein the sharpness weight is 1 for a filtered pixel value that exceeds the sharpness threshold and the sharpness weight is 0 for a filtered pixel value that is less than or equal to the sharpness threshold.

7. The method of claim 1, wherein the sharpness weight for each filtered pixel value is calculated as a linear function of the filtered pixel value.

8. The method of claim 1, wherein the sharpness weight SW for each filtered pixel value is calculated as $SW=1-NHV$ where NHV is a normalized histogram value for the filtered pixel value.

9. The method of claim 1, wherein the edge extraction filter is selected from the group consisting of a Laplacian of Gaussian filter, a downsize function and a Laplacian filter, a Sobel filter, a Canny edge detector, a Difference of Gaussian filter, a Prewitt filter, and a Roberts filter.

10. An apparatus comprising:
a processor performing:
  filtering an image with an edge extraction filter to generate filtered pixel values for each pixel of the image;
  calculating a sharpness threshold as a function of the filtered pixel values;
  calculating a sharpness weight for each filtered pixel value as a function of the filtered pixel value and the sharpness threshold;
  calculating a weighted pixel value for each filtered pixel value as a function of the filtered pixel value and the corresponding sharpness weight for the filtered pixel value; and
  calculating a sharpness value for the image as a mean of the weighted pixel values.

11. The apparatus of claim 10, the processor further performing:
  recording a plurality of images with corresponding camera parameters for each image of the plurality of images, wherein each image is captured at a capture time that is one of before a trigger event, concurrent with the trigger event, and after the trigger event;
  calculating a sharpness value for each image of the plurality of images; and
  selecting a sharpest image with a greatest sharpness value.

12. The apparatus of claim 11, the processor further performing:
  updating default camera parameters with first camera parameters corresponding to the sharpest image; and
  deleting unselected images of the plurality of images.

13. The apparatus of claim 10, the processor further performing:
  identifying a plurality of similar images;
  determining a sharpness value for each image of the plurality of similar images;
  ranking the plurality of similar images based on the sharpness values; and
  performing an action on each image of the plurality of similar images based on an image rank for the image.

14. The apparatus of claim 10, wherein the sharpness threshold is calculated by one of calculating a mean of the filtered pixel values and generating a bimodal histogram of the filtered pixel values and selecting the sharpness threshold to minimize a variance between each bimodal mode.

15. The apparatus of claim 10, wherein the sharpness weight is 1 for a filtered pixel value that exceeds the sharpness threshold and the sharpness weight is 0 for a filtered pixel value that is less than or equal to the sharpness threshold.

16. The apparatus of claim 10, wherein the sharpness weight for each filtered pixel value is calculated as a linear function of the filtered pixel value.

17. The apparatus of claim 10, wherein the sharpness weight SW for each filtered pixel value is calculated as $SW=1-NHV$ where NHV is a normalized histogram value for the filtered pixel value.

18. The apparatus of claim 10, wherein the edge extraction filter is selected from the group consisting of a Laplacian of Gaussian filter, a downsize function and a Laplacian filter, a Sobel filter, a Canny edge detector, a Difference of Gaussian filter, a Prewitt filter, and a Roberts filter.

19. A program product comprising a computer readable storage medium that stores code executable by a processor to perform:
  filtering an image with an edge extraction filter to generate filtered pixel values for each pixel of the image;
  calculating a sharpness threshold as a function of the filtered pixel values;
  calculating a sharpness weight for each filtered pixel value as a function of the filtered pixel value and the sharpness threshold;
  calculating a weighted pixel value for each filtered pixel value as a function of the filtered pixel value and the corresponding sharpness weight for the filtered pixel value; and
  calculating a sharpness value for the image as a mean of the weighted pixel values.

20. The program product of claim 19, the code further executable by the processor to perform:
  recording a plurality of images with corresponding camera parameters for each image of the plurality of images, wherein each image is captured at a capture time that is one of before a trigger event, concurrent with the trigger event, and after the trigger event;
  calculating a sharpness value for each image of the plurality of images; and
  selecting a sharpest image with a greatest sharpness value.

* * * * *